United States Patent [19]

Krogsrud

[11] 4,160,536

[45] * Jul. 10, 1979

[54] COUNTERBALANCED ARM

[75] Inventor: Jens C. Krogsrud, Oslo, Norway

[73] Assignee: Jac. Jacobsen A/S, Oslo, Norway

[*] Notice: The portion of the term of this patent subsequent to Mar. 21, 1995, has been disclaimed.

[21] Appl. No.: 888,576

[22] Filed: Mar. 20, 1978

Related U.S. Application Data

[63] Continuation-in-part of Ser. No. 735,988, Oct. 27, 1976, Pat. No. 4,080,530.

[51] Int. Cl.² ............................................. F21V 21/26
[52] U.S. Cl. ............................... 248/280.1; 248/123.1; 362/402
[58] Field of Search ............... 248/292, 280, 281, 123; 362/402, 427

[56] References Cited

U.S. PATENT DOCUMENTS

| 3,000,606 | 9/1961 | Storm et al. | 248/281 X |
| 3,498,577 | 3/1970 | Mehr | 248/280 |
| 3,547,390 | 12/1970 | Mehr | 248/280 |
| 3,774,873 | 11/1973 | Krogsrud | 248/280 |
| 3,856,251 | 12/1974 | Miller | 248/280 |
| 4,080,530 | 3/1978 | Krogsrud | 248/280 X |

FOREIGN PATENT DOCUMENTS 659561  10/1951  United Kingdom ...................... 248/281

*Primary Examiner*—J. Franklin Foss
*Attorney, Agent, or Firm*—Harold L. Stults; Pasquale A. Rassano

[57] ABSTRACT

An equapoised arm assembly is counterbalanced by springs enclosed within tubes that are components of the arm assembly. The arm assembly has a lower pair of parallel arms which are pivoted at their lower ends to a swivel bracket that turns about a vertical axis in a fixed bracket. Each of these arms is pivoted at its upper end to a floating bracket that is pivoted to a similar upper pair of parallel arms. An article support bracket is mounted upon the other end of the upper pair of arms and may include a universal joint assembly. The arms are tubular and each pair forms a parallelogram by virtue of the pivotal connections with the respective brackets. A coil spring is enclosed within one arm of each pair of arms to exert a counterbalancing effect upon its pair of arms. A nylon shoe is connected to at least one end of each spring and is slidable within the tube. The shoe is connected through a rod to an adjacent bracket of the assembly to transmit the counterbalancing force from the spring to the adjacent bracket. By connecting a shoe and rod to both ends of the spring, it is stretched from both these ends whereby its counterbalancing force is doubled. This force is a function of the tangent of the angle between the direction of the spring force (i.e. the longitudinal axis of the tube it is in) and the connection(s) between the slide and bracket, whereby the actual spring force may be smaller than that used to produce the same counterbalancing force in prior equapoised arm assemblies.

17 Claims, 9 Drawing Figures

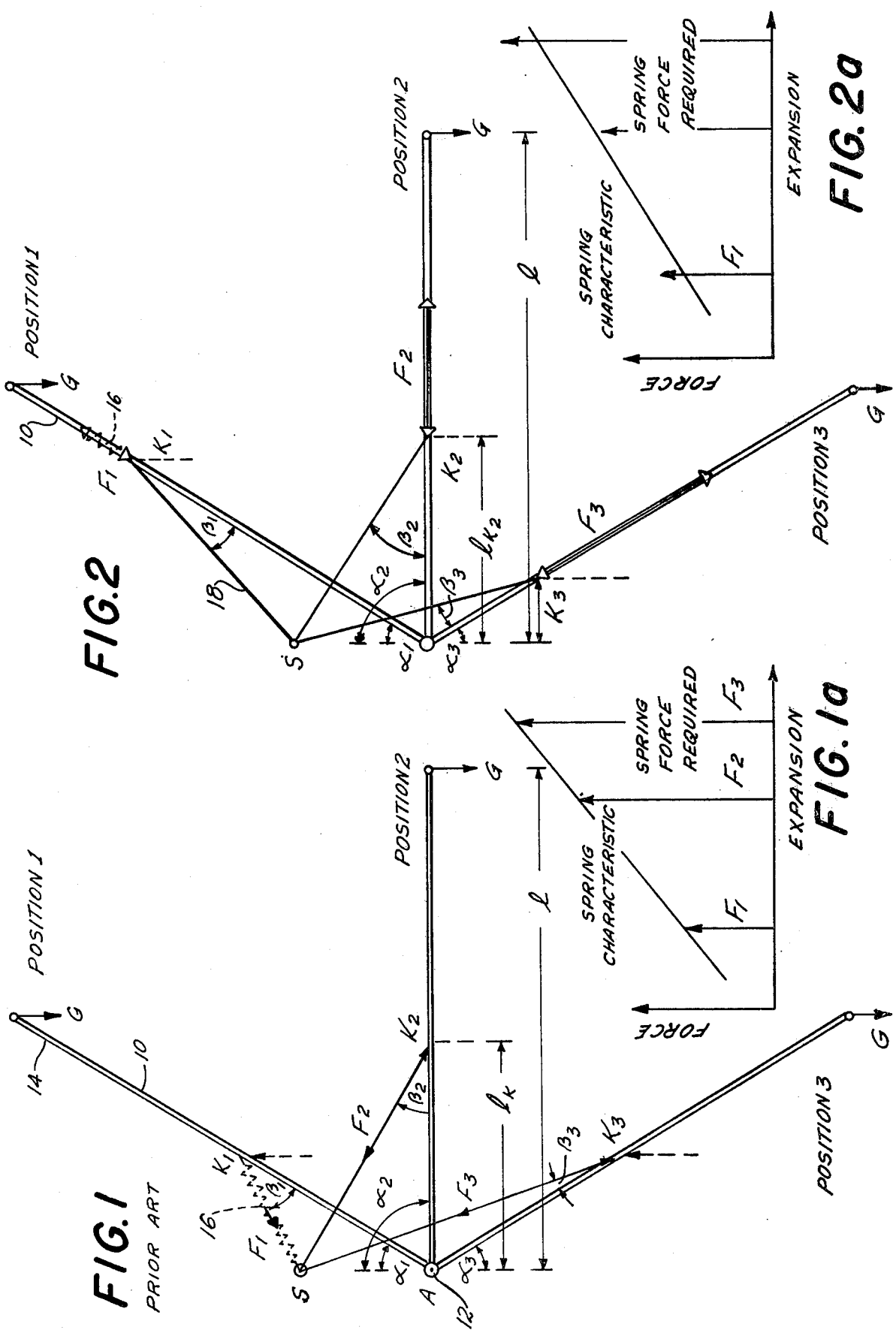

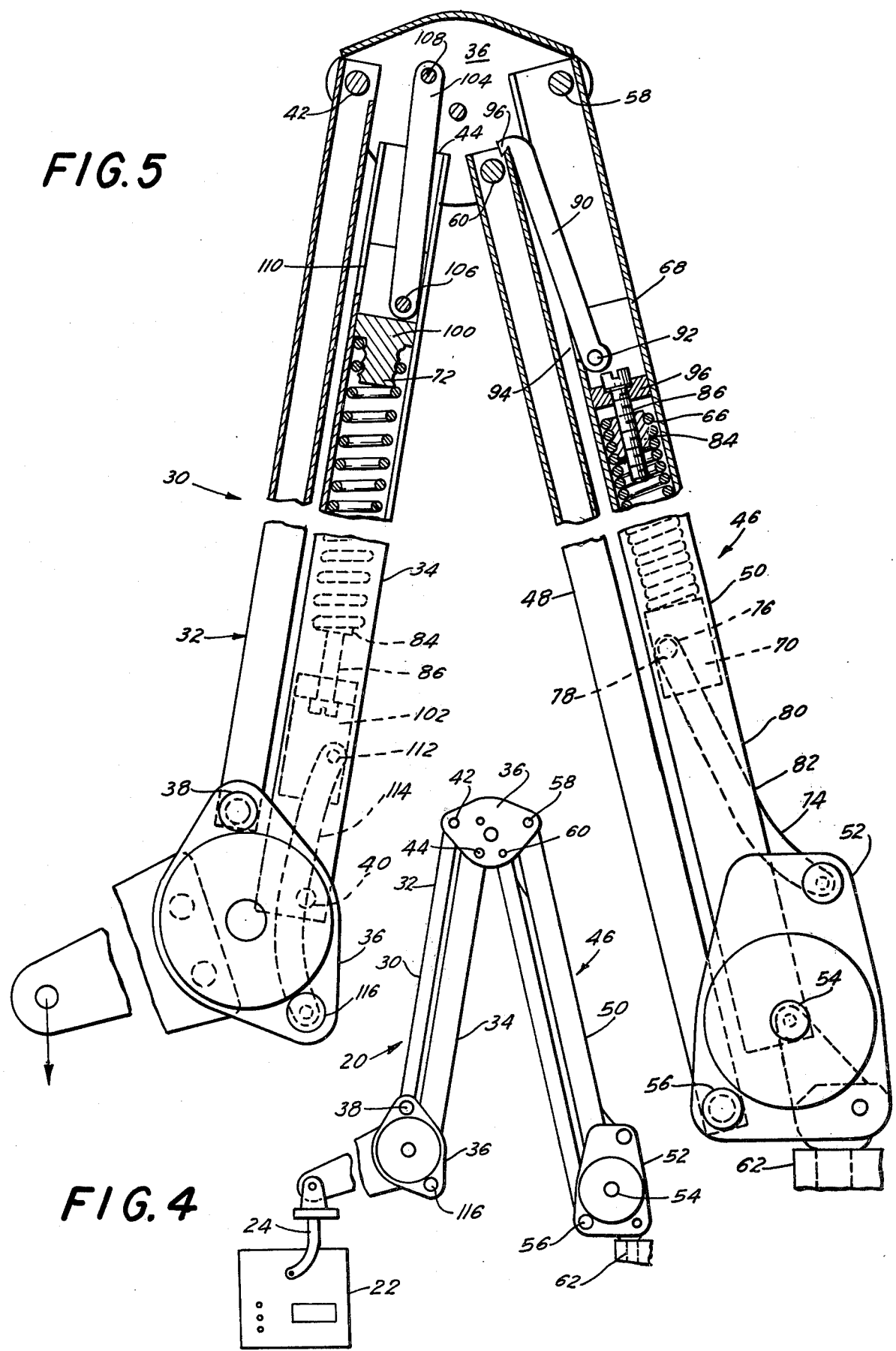

COUNTERBALANCED ARM

This application is a continuation-in-part of U.S. patent application Ser. No. 735,988, filed Oct. 27, 1976, now U.S. Pat. No. 4,080,530, the disclosure of which is incorporated herein by reference.

This invention relates to spring counterbalanced arm assemblies, and more in particular to such assemblies adapted to support relatively heavy objects such as televisions.

An object of this invention is to provide improved spring counterbalanced arm assemblies. A further object is to provide such assemblies which avoid difficulties encountered with counterbalanced arm assemblies in the past. A further object is to provide spring counterbalanced arm assemblies of the above character which are superior to those available in the past in that they are more attractive and which do not have exposed springs. These and other objects will be in part obvious and in part pointed out below.

Spring counterbalanced arm assemblies have been provided for supporting various components and objects, and particularly for supporting lamp heads and television sets. Some such assemblies have been provided which are free of external springs, but they have had serious deficiencies in use. For example, some have not functioned properly while others have been too complicated or costly or have had limited useful life. Counterbalanced arm assemblies with external coil springs have been provided and have proven very satisfactory. However, the springs tend to collect dust and other dirt, although that objection has been somewhat reduced by providing sleeves over the springs. Nevertheless, the mounting structures for the springs cause certain difficulties. The best known equapoised or counterbalanced arm assemblies have external springs used in parallelogram arm assemblies. Such assemblies are generally satisfactory for use in supporting light objects such as lamp heads, but when used to support heavier objects such as television sets, much heavier springs are necessary. This substantially increases the cost of manufacture.

Counterbalanced arm assemblies have also been provided for objects such as television sets where each arm is formed by mating channels which enclose the counterbalancing springs. It is an object of the present invention to provide arm assemblies for relatively heavy objects wherein counterbalanced springs are totally enclosed within generally tubular one-piece arm assemblies. It is a further object to provide for the above with constructions wherein coil springs exert forces longitudinally of the arms and those forces are exerted in an improved manner to provide the desired counterbalancing effects with reduced force. These and other objects will be in part obvious and in part pointed out below.

Referring to the drawings:

FIG. 1 is a schematic force diagram showing the forces active in a conventional exterior spring equapoised arm assembly;

FIG. 1a is a diagram showing the relative spring forces at each of the three arm positions shown in FIG. 1;

FIG. 2 is a schematic force diagram showing the forces active in an equapoised arm constructed in accordance with the present invention;

FIG. 2a is a diagram showing the relative spring forces at each of the three arm positions shown in FIG. 2;

Figure 3A:
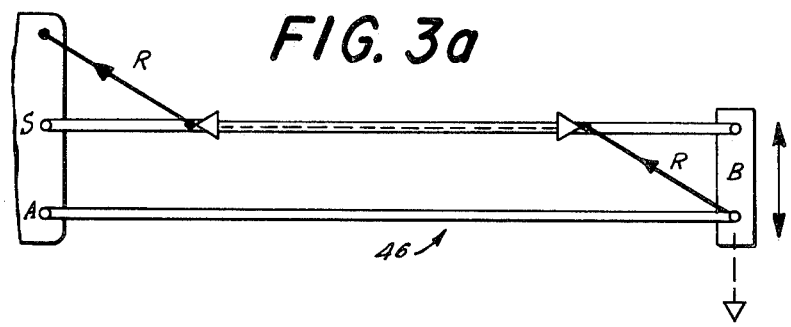
FIGS. 3a and 3b are schematic force diagrams showing the principle of the spring being stretched from both ends as in the present invention, thereby doubling the counterbalancing force extended by the spring.
Figure 3B:
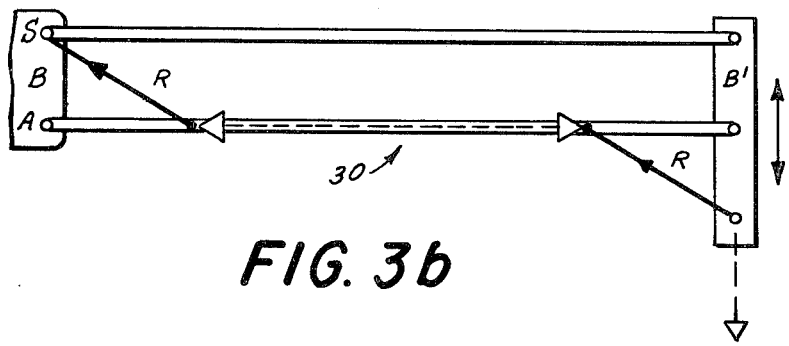
Figure 3C:
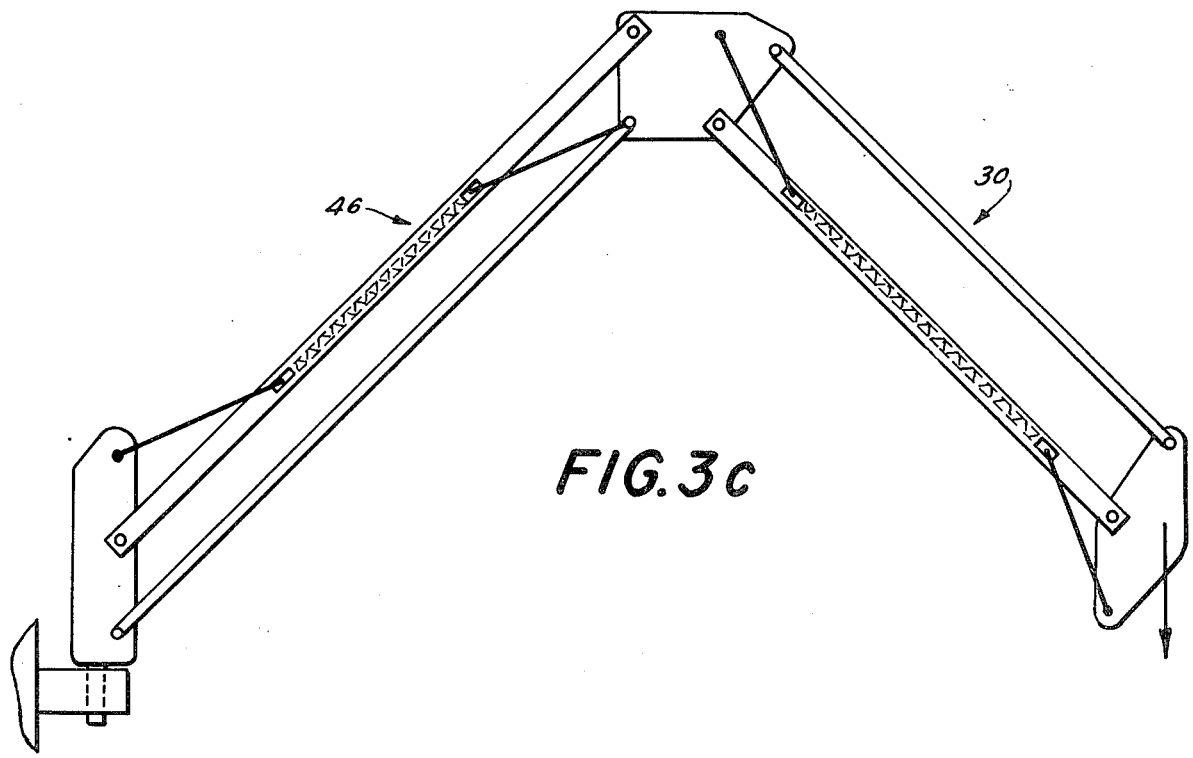

FIG. 3c schematically illustrates the principle as applied to the present invention;

FIG. 4 is an elevational view of an equapoised arm assembly constructed in accordance with the present invention; and FIG. 5 is an enlarged elevational view, with parts broken away, of the arm assembly shown in FIG. 4.

Referring initially to FIG. 1 of the drawing, a schematic force diagram is provided of a conventional equapoised arm assembly in which exterior springs are used to counterbalance the arm. As seen therein, the support arm 10 is pivoted on a support 12 for pivotal movement in a vertical plane about pivot A while supporting a weight G at its free end 14. The weight of the arm 10 and weight G is counterbalanced by the force produced by a spring 16 connected between a fixed point K on the arm and a fixed support point S on, for example, a support bracket directly above the pivot A. In this arrangement, the point of spring attachment K, to the arm is a fixed distance from the pivot point A. Thus, the pulling force (F) required of the spring 16, which is connected beetwein points S and K, increases in exact proportion to the increase of the distance between points S and K as the arm is moved. Thus, in position 1 the spring force $F_1$ is smaller than the spring force $F_2$ at position 2 which is, in turn, smaller than $F_3$ at position 3. These forces all lie on a straight line, in accordance with its spring characteristics, as shown in FIG. 1a.

Of course, the actual spring force applied is a function of the weight G being balanced, and it can be shown mathematically, as will be understood by those skilled in the art, that the spring force F at any given position of the arm 10 will be determined in accordance with the equation:

$$F = G \cdot 1/1_k \cdot \sin\alpha/\sin\beta$$

where the parameters $1$, $1_k$, $\alpha$ and $\beta$ are as shown in FIG. 1.

The arm of the present invention operates under a somewhat different principle and free formula due to the location of the spring and the fact that at least one of its ends is not fixed relative to its associated arm. In accordance with this invention, the spring is located within arm 10 and one of its ends is connected to the support S through a rigid rod 18 with the end of the spring being movable within the arm. Thus, the point of application of the counterbalancing force (shown by dotted arrow lines in the drawing) produced by the spring varies in distance from the pivot point A as the arm is moved. With this arrangement, it can be shown mathematically that the spring force required to produce the necessary counterbalancing force will follow the equation:

$$F = G \cdot 1/1_k \cdot \sin\alpha/\tan\beta$$

where $\beta$ is the angle between the direction of the spring force (i. e. the longitudinal axis of arm 10) and the connecting rod 18.

By using this formula to calculate the spring force, it will be seen that the spring force required by the spring in this embodiment is not linearly proportioned to the movement of the arm, as is the case in the prior art. However, the deviation is slight and does not affect the balance of the arm, particularly if the distance between points A and S are not great. But, the advantages achieved by this arrangement are considerable. In addition to the fact that the spring is hidden from view, less force is required from the spring to produce the counterbalancing force than as compared to the prior art devices because the required force is a function of the tangent of the angle $\beta$ rather than the sine of $\beta$. Therefore, the assembly can use smaller springs than prior devices to support the same weight; or it can support a greater weight with the same spring.

FIG. 3 gives a schematic illustration of the two arms of the present invention where the spring, thanks to the parallel movement of brackets B, B' in relation to the pivoting points A S, is stretched from both ends by the rods R thereby doubling the counterbalancing action of the spring.

The arm of FIG. 3a corresponds to arm 46 of FIG. 5 while the arm of FIG. 3b corresponds to the arm 30 of FIG. 5.

Referring now to FIG. 4 of the drawings, a counterbalanced arm assembly 20, constructed in accordance with the present invention, is shown in which a television set 22, or other relatively heavy object, is supported by a known type of universal pivot assembly 24 upon the free end of a parallelogram arm assembly 30 formed by a pair of square tubular arms 32 and 34, a bracket 36 to which the left-hand ends of the arms are pivoted and a floating bracket 38 at the right to which the right-hand ends of the arms are pivoted. The arms are of identical length and the spacings between the pivots 39, 40 and 42, 44 in brackets 12 and 14, respectively, are equally spaced so as to form a parallelogram relationship.

Bracket 38 is, in turn, mounted upon the upper end of an arm assembly 46 formed by a pair of arms 48 and 50 which are pivoted in parallel relationship at their upper ends to bracket 38 and at their lower ends to a swivel bracket 52. The spacings between the pivotal connections 54, 56 between arms 48 and 50 and bracket 38 are the same as the connections 58, 60 between the arms and bracket 50 so as to provide a parallelogram relationship. Bracket 52 is pivotally mounted to swing about a vertical axis in a mounting bracket 62 which is fastened to a wall or other support, in any conventional manner.

As seen in FIG. 5, arms 32, 34, 48 and 50 are thin walled tubes; in this embodiment, steel. Arms 32 and 34 are attached to bracket 36 by pivot bolts 39 and 40, respectively, and to bracket 38 by bolts 42 and 44, respectively, in any convenient manner. Arms 48 and 50 are pivoted to bracket 38 by bolts 58 and 60, respectively, and to bracket 52 by bolts 54 and 56, respectively. Those bolts act as pivot pins for the arms.

Each of the arm assemblies is counterbalanced by forces tending to hold the television or other object 22 against the action of gravity while in any position to which the lamp assembly is moved manually. The object can be swung vertically through an arc determined by the pivots formed by bolts 42 and 44, and arms 48 and 50 may be swung around the pivots formed by bolts 54 and 56 so as to move the object horizontally with there also being downward movement from the position shown. During that movement, due to the parallelogram construction, the aspect of the object is unchanged, that is, the television assembly remains in the vertical axis position shown, or in any other position to which it is turned by virtue of the universal pivot assembly 24. It is known that an arm assembly of the general type described above provides a very satisfactory mounting for a lamp assembly with the arm assembly being spring counterbalanced. The present invention is characterized as having an improved spring counterbalanced system.

As described above with respect to FIG. 2, the counterbalancing forces are produced by spiral coil springs, e.g. tension springs, contained within the tubular arms. In the illustrated embodiment, the springs 64 and 66 are located within arms 34 and 50, respectively. Referring to arm 50, spring 66 is connected at its ends to shoes 68, 70 which are slidably mounted in the tube. Shoe 70 is square in cross-section, with an integral extension or stud 72 provided with threads mating with the coils of the spring and that acts as a firm attachment to the end of spring 66.

The main portion of shoe 70 presents an outer surface which conforms to the inner surface of tube 50 so as to provide a free-sliding relationship. That relationship is insured by the low friction between the nylon shoe and the tube. A rod or bar 74 having an eye 76 is pivotally connected to shoe 70 by a pin 78 positioned in eye 76, so as to provide a hinged or rocking connection between the rod and the shoe. The other end of rod 74 is pivotally connected to bracket 52. In this regard, the rear side 80 of arm 50 has a longitudinal slot 82 formed therein along its lower end so that bar 74 can extend through it and vary its angular relation to spring 66 during movement of arm 50. The other end of spring 66 is connected to shoe 68 through a separate stud 84, similar to stud 72 described above, and a bolt 86 having a screw head 88. The bolt is freely rotatably mounted in shoe 68 and threadably engaged with stud 84. By this arrangement, rotation of bolt 86 will cause stud 84 and thus the end of the spring secured to the stud, to move and permit adjustment of the spring force. To facilitate such adjustment, the upper end of tube 50 is opened to permit insertion of a screw driver or the like therein to rotate bolt 86.

Shoe 68 has an outer surface which conforms to the inner surface of tube 50 to also provide a free-sliding relationship, which is insured by the low friction between the nylon shoe and the tube. A rod or bar 90 is pivotally connected to shoe 68 by a pin 92 or the like to provide a hinged or working connection between the rod and shoe.

As seen in FIG. 4, the inner surface 96 of arm 50 is provided with a slot 94 that is slightly greater than the width of bar 90 so as to permit the bar to extend upwardly and move freely with shoe 68 as the shoe moves toward and away from the end of arm 50. Thus rod 90 can extend at an angle through slot 94 to the point adjacent the pivotal connection between arm 50 and bracket 38. The end of the rod has an integral hook 96 which extends around the right-hand edge of the rear wall of arm 48 so that rod 90 is anchored at its left-hand end to bracket 38 through the end of tube 48 and pin 60.

When arms 48 and 50 swing downwardly from the positions shown, the portion of the arm where shoe 68 is positioned in FIG. 4 is moved away from the upper end of arm 48 so that shoe 68 is pulled and slides upwardly in the arm, similarly shoe 70 slides downwardly in the arm extending spring 66 from both ends. This double action referred to in FIG. 3 is the main contributor to the arms' considerable lifting capacity. The force of the spring is exerted along the axis of the arm, and shoes 68, 70 move along that axis; however, the force is applied to the brackets at an angle to that axis through rods 74, 90. The angular relationship between that axis and the rods does not tend to distort the spring, and the low-friction relationship between the shoe and the arm insure that the shoe will move freely longitudinally of the arm. Similarly, when arms 40 and 50 swing upwardly toward the position shown, shoe 68 moves downwardly in the arm and the tension on the spring is reduced. The characteristics of spring 66 are such as to insure proper counterbalancing forces throughout the range of the swinging movement of the arms, as described above.

Referring to arm 34, spring 64 is anchored in the upper end to shoe 100 which is identical to the shoe 70 previously described. The lower end of the spring is connected through a stud 84 and bolt 86 to a shoe 102 identical to shoe 68 previously described, whereby the tension of the spring can be varied through the open end of arm 34.

A rod 104 has a bottom end 106 which is pivotally connected to shoe 100 and a top end 108 pivotally connected to bracket 38. The left side wall of tube 34 has a slot 110 formed therein similar to slot 94 in that it is slightly wider than the associated rod 104.

The shoe 102 is pivotally connected to one end 112 of a second bar 114 whose opposite end 116 is pivotally connected to bracket 36. The rear side of arm 34 may be slotted with a slot similar to slot 82 previously described to accommodate movement of bar 114.

When arms 32 and 34 are in the position of FIG. 5, the spring 64 is stretched almost to its maximum, but as bars 104 and 114 are almost in longitudinal alignment with bolts 40 and 44, the lifting power of arm 34 is close to nil. As arms 32 and 34 are swung to the left from the generally vertical position of FIG. 5 (in a clockwise direction), rods 104 and 114 move out of their general alignment with bolts 40 and 44 whereby the lifting power increases rapidly although the spring tension is decreased by the same movement. The relationship between spring tension and angle of rods to arm at the different arm positions gives the proper counterbalancing effect in accordance with equations on pages 3 and 4. It is thus seen that the two arm assemblies provide proper support for the object throughout the entire range of its movement.

The positioning of the springs within the tubular arms overcomes various objections and difficulties which are present with exposed springs. The provision of the shoes as anchors for the ends of the springs insures that the counterbalancing forces of the springs are transmitted efficiently and dependably at all times. In each arm assembly, the brackets at the ends of the arms are operatively connected to the spring in one of the arms through sliding shoes. The rods connecting the spring (through its shoe) to the brackets extend through slots in the side walls of the arms. Also, it should be noted that in each case the gravity forces and the counterbalancing forces maintain a static situation at every position of the arm.

Although an illustrative embodiment of the present invention has been described herein, it is to be understood that various changes and modifications thereof can be effected without departing from the scope or spirit of the invention.

What is claimed is:

1. A counterbalanced arm assembly comprising, in combination, a parallelogram arm assembly including a pair of parallely extending arms and a pair of brackets respectively positioned at opposite ends of said arms; means for pivotally connecting each end of each of said arms to its adjacent bracket at pivot axes whereby the arms and brackets define a parallelogram; at least one of said arms being hollow and defining an elongated cavity therein; an extensible spring positioned within said cavity; means for operatively connecting one end of said spring to one of said brackets; a shoe operatively connected to the other end of said spring and being slidable within said hollow arm and means for operatively connecting said shoe to the other of said brackets along a line which is at an angle to the hollow arm to transmit counterbalancing forces from the spring through said shoe to said other bracket and arm assembly whereby the counterbalancing forces are a function of the tangent of the angle between said connecting means and the hollow arm; said means for operatively connecting said one end of said spring to said one of the brackets comprises a second shoe slidably positioned in said cavity and a rigid link operatively connecting said one bracket to the second shoe.

2. A counterbalanced arm assembly as defined in claim 1 wherein at least one of said shoes includes means for adjusting the force applied by the spring.

3. A counterbalanced arm assembly comprising, in combination, a parallelogram arm assembly including a pair of parallely extending arms and a pair of brackets respectively positioned at opposite ends of said arms; means for pivotally connecting each end of each of said arms to its adjacent bracket at pivot axes whereby the arms and brackets define a parallelogram; at least one of said arms being hollow and defining an elongated cavity therein; an extensible spring positioned within said cavity; means for operatively connecting one end of said spring to one of said brackets; a shoe operatively connected to the other end of said spring and being slidable within said hollow arm and means for operatively connecting said shoe to the other of said brackets along a line which is at an angle to the hollow arm to transmit counterbalancing forces from the spring through said shoe to said other bracket and arm assembly whereby the counterbalancing forces are a function of the tangent of the angle between said connecting means and the hollow arm; said means for operatively connecting said one end of said spring to said one of the brackets comprising a second shoe slidably positioned in said cavity and a rigid link operatively connecting said one bracket to the second shoe; at least one of said shoes including means for adjusting the force applied by the spring; and said spring comprising a coil spring and said adjusting means comprising a generally cylindrical block engaged in the adjacent end of the spring and a bolt rotatably mounted in the slide and threadably engaged with the block; the end of said hollow tube adjacent the bolt being open to provide access to the bolt for adjustment thereof.

4. A counterbalanced arm assembly as defined in claim 1 including a second parallelogram arm assembly comprising a second pair of parallely extending arms pivotally connected at one end to said other of said brackets and a third bracket pivotally connected to the other ends of said second pair of arms to define a second parallelogram; at least one of said second pair of arms being hollow and defining an elongated cavity therein;

an extensible spring positioned within said cavity; means for operatively connecting one end of said spring to one of the brackets associated with the second pair of arms; a shoe operatively connected to the other end of said spring and being slidable within said hollow arm; and means for operatively connecting said shoe to the other of the brackets associated with said second pair of arms along a line which is at an angle to the hollow arm to transmit counterbalancing forces from the spring through said shoe to the arm assembly whereby the counterbalancing forces are a function of the tangent of the angle between the connecting means and the hollow arm.

5. A counterbalanced arm assembly as defined in claim 4 wherein the springs in each said arm assemblies are tension springs.

6. A counterbalanced arm assembly comprising, in combination, a parallelogram arm assembly including a pair of parallely extending arms, first and second brackets respectively positioned at opposite ends of said arms, and means for pivotally connecting each end of each of said arms to their adjacent bracket at pivot axes which define a parallelogram; one of said arms being hollow and defining an elongated cavity therein; a spring positioned within said cavity; a pair of shoes slidably positioned within said cavity adjacent and connected to opposite ends of said spring; and rigid means for respectively connecting said shoes to their adjacent brackets at angles with respect to the longitudinal axis of the hollow arm and the direction of the spring force, and means for mounting said first bracket on a support; whereby upon application of a downward force to said second bracket in the plane of said parallelogram arm assembly the spring is stressed longitudinally of the hollow arm and produces a counterbalancing force which is a function of the tangent of the angle between the connecting means associated with said first bracket and the longitudinal axis of the hollow arm.

7. A counterbalanced arm assembly as defined in claim 6 wherein at least one of said shoes includes means for adjusting the force applied by the spring.

8. A counterbalanced arm assembly comprising, in combination, a parallelogram arm assembly including a pair of parallely extending arms, first and second brackets respectively positioned at opposite ends of said arms, and means for pivotally connecting each end of said arms to their adjacent bracket at pivot axes which define a parallelogram; one of said arms being hollow and defining an elongated cavity therein; a spring positioned within said cavity; a pair of shoes slidably positioned within said cavity adjacent and connected to opposite ends of said spring; and rigid means for respectively connecting said shoes to their adjacent brackets at angles with respect to the longitudinal axis of the hollow arm and the direction of the spring force, and means for mounting said first bracket on a support; whereby upon application of a downward force to said second bracket in the plane of said parallelogram arm assembly the spring is stressed longitudinally of the hollow arm and produces a counterbalancing force which is a function of the tangent of the angle between the connecting means associated with said first bracket and the longitudinal axis of the hollow arm; at least one of said shoes including means for adjusting the force applied by the spring; said spring comprising a coil spring and said adjusting means comprising a generally cylindrical block engaged in the adjacent end of the spring and a bolt rotatably mounted in the slide and threadably engaged with the block; the end of said hollow tube adjacent the bolt being open to provide access to the bolt for adjustment thereof.

9. A counterbalancing arm assembly as defined in claim 6 including a second parallelogram arm assembly comprising a second pair of parallel arms pivotally connected at one end to said second bracket and a third bracket pivotally connected to the other ends of said second pair of arms to define a second parallelogram; at least one of said second pair of arms being hollow and defining an elongated cavity therein; an extensible spring positioned in said cavity; a pair of shoes slidably positioned within said cavity adjacent and connected to opposite ends of said spring; and rigid means for respectively connecting said shoes to said second and third brackets at angles with respect to the longitudinal axis of its hollow arm and the direction of the spring force; whereby upon application of a downward force to said third bracket in the plane of said second parallelogram arm assembly the spring is stressed longitudinally of its hollow arm and produces a counterbalancing force which is a function of the tangent of the angle between the connecting means of the second paralelogram assembly with said second bracket and the longitudinal axis of the hollow arm.

10. A counterbalanced arm assembly comprising, in combination, a parallelogram arm assembly including a pair of parallely extending arms and a pair of brackets respectively positioned at opposite ends of said arms; means for pivotally connecting each end of each of said arms to their adjacent brackets at pivot axes whereby the arms and brackets define a parallelogram; at least one of said arms being hollow and defining an elongated cavity therein; an extensible spring positioned within said cavity; means for operatively connecting the opposed ends of said springs to said brackets; said means including a pair of shoes respectively operatively connected to the opposite ends of said spring and being slidable within said hollow arm and means for operatively connecting said shoes to their adjacent brackets, whereby the effective counterbalancing force provided by the spring is increased.

11. A counterbalanced arm assembly as defined in claim 10 wherein at least one of said shoes includes means for adjusting the force applied by the spring.

12. A counterbalanced arm assembly comprising, in combination, a parallelogram arm assembly including a pair of parallely extending arms and a pair of brackets respectively positioned at opposite ends of said arms; means for pivotally connecting each end of each of said arms to their adjacent brackets at pivot axes whereby the arms and brackets define a parallelogram; at least one of said arms being hollow and defining an elongated cavity therein; an extensible spring positioned within said cavity; means for operatively connecting the opposed ends of said springs to said brackets; said means including a pair of shoes respectively operatively connected to the opposite ends of said spring and being slidable within said hollow arm and means for operatively connecting said shoes to their adjacent brackets, whereby the effective counterbalancing force providing by the spring is increased; at least one of said shoes including means for adjusting the force applied by the spring; said spring comprising a tension coil spring and said adjusting means comprising a generally cylindrical block engaged in the adjacent end of the spring a bolt rotatably mounted in the slide and threadably engaged with the block; the end of said hollow tube adjacent the bol being open to provide access to the bolt for adjustment thereof.

13. A counterbalanced arm assembly as defined in claim 12 including a second parallelogram arm assembly comprising a second pair of parallely extending arms pivotally connected at one end to said other of said brackets and a third bracket pivotally connected to the other ends of said second pair of arms to define a second parallelogram; at least one of said second pair of arms being hollow and defining an elongated cavity therein; an extensible spring positioned within said cavity; means for operatively connecting the opposite ends of said spring to the brackets associated with the second pair of arms; said means including a pair of shoes respectively operatively connected to the opposite ends of said spring and being slidable within said hollow arm; and means for operatively connecting said shoes to their adjacent brackets.

14. A counterbalanced arm assembly comprising, in combination, a parallelogram arm assembly including a pair of parallely extending arms, first and second brackets respectively positioned at opposite ends of said arms, and means for pivotally connecting each end of each of said arms to their adjacent bracket at pivot axes which define a parallelogram; one of said arms being hollow and defining an elongated cavity therein; a spring positioned within said cavity; a pair of shoes slidably positioned within said cavity adjacent and connected to opposite ends of said spring; and rigid means for respectively connecting said shoes to their adjacent brackets, and means for mounting said first bracket on a support; whereby the effective counterbalancing force produced by the spring is increased.

15. A counterbalanced arm assembly as defined in claim 14 wherein at least one of said shoes includes means for adjusting the force applied by the spring.

16. A counterbalanced arm assembly comprising, in combination, a parallelogram arm assembly including a pair of parallely extending arms, first and second brackets respectively positioned at opposite ends of said arms, and means for pivotally connecting each end of each of said arms to their adjacent bracket at pivot axes which define a prallelogram; one of said arms being hollow and defining an elongated cavity therein; a spring positioned within said cavity; a pair of shoes slidably positioned within said cavity adjacent and connected to opposite ends of said spring; and rigid means for respectively connecting said shoes to their adjacent brackets, and means for mounting said first bracket on a support; whereby the effective counterbalancing force produced by the spring is increased; at least one of said shoes including means for adjusting the force applied by the spring; said spring comprising a coil spring and said adjusting means comprising a generally cylindrical block engaged in the adjacent end of the spring and a bolt rotatably mounted in the slide and threadably engaged with the block; the end of said hollow tube adjacent the bolt being open to provide access to the bolt for adjustment thereof.

17. A counterbalancing arm assembly as defined in claim 14 including a second parallelogram arm assembly comprising a second pair of parallel arms pivotally connected at one end to said second bracket and a third bracket pivotally connected to the other ends of said second pair of arms to define a second parallelogram; at least one of said second pair of arms being hollow and defining an elongated cavity therein; an extensible spring positioned in said cavity; a pair of shoes slidably positioned within said cavity adjacent and connected to opposite ends of said spring; and rigid means for respectively connecting said shoes to said second and third brackets.

* * * * *

UNITED STATES PATENT AND TRADEMARK OFFICE
CERTIFICATE OF CORRECTION

PATENT NO. : 4,160,536
DATED : July 10, 1979
INVENTOR(S) : Jens C. Krogsrud

It is certified that error appears in the above-identified patent and that said Letters Patent are hereby corrected as shown below:

Claim 12, lines 61-62, change "providing" to ---provided---.

Claim 12, column 9, line 1, change "bol" to ---bolt---.

Signed and Sealed this

Twentieth Day of November 1979

[SEAL]

Attest:

RUTH C. MASON
Attesting Officer

LUTRELLE F. PARKER
Acting Commissioner of Patents and Trademarks